(12) United States Patent
Potapenko et al.

(10) Patent No.: US 10,808,497 B2
(45) Date of Patent: *Oct. 20, 2020

(54) METHODS OF ZONAL ISOLATION AND TREATMENT DIVERSION

(71) Applicant: SCHLUMBERGER TECHNOLOGY CORPORATION, Sugar Land, TX (US)

(72) Inventors: Dmitriy Ivanovich Potapenko, Sugar Land, TX (US); Alexey Alexandrovich Sova, Novosibirsk (RU); Svetlana Viktorovna Nesterova, Novosibirsk (RU); Olga Petrovna Alekseenko, Novosibirsk (RU); Bruno Lecerf, Houston, TX (US); Marina Nikolaevna Bulova, Moscow (RU); John Daniels, Anacortes, WA (US); Jose Alberto Ortega Andrade, Houston, TX (US); Bernhard Lungwitz, Wuerzburg (DE); Jiangshui Huang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,684

(22) Filed: Nov. 18, 2016

(65) Prior Publication Data

US 2017/0198191 A1 Jul. 13, 2017

Related U.S. Application Data

(63) Continuation-in-part of application No. 15/083,892, filed on Mar. 29, 2016, now abandoned, which is a
(Continued)

(51) Int. Cl.
*E21B 33/138* (2006.01)
*C09K 8/516* (2006.01)
(Continued)

(52) U.S. Cl.
CPC ............ *E21B 33/138* (2013.01); *C09K 8/516* (2013.01); *C09K 8/70* (2013.01); *C09K 8/80* (2013.01);
(Continued)

(58) Field of Classification Search
None
See application file for complete search history.

(56) References Cited

U.S. PATENT DOCUMENTS 3,316,967 A * 5/1967 Huitt ..................... E21B 43/267
166/280.1
4,051,900 A * 10/1977 Hankins .................. C09K 8/80
166/278

(Continued)

FOREIGN PATENT DOCUMENTS

GB 2007745 A 5/1979
GB 2197364 A 5/1988
(Continued)

OTHER PUBLICATIONS

Albertsson et al., "Aliphatic Polyesters: Synthesis, Properties and Applications", Advances in Polymer Science: Degradable Aliphatic Polyesters, 2002, pp. 1-40, vol. 157.
(Continued)

*Primary Examiner* — Anuradha Ahuja
(74) *Attorney, Agent, or Firm* — Rodney Warfford

(57) ABSTRACT

Methods of treating a subterranean formation penetrated by a well bore, by providing a treatment fluid comprising a blend including a first amount of particulates having a first average particle size between about 3 mm and 2 cm and a
(Continued)

Triangle

Bi-rod

Trefoil          Quatrefoil second amount of particulates having a second average size between about 1.6 and 20 times smaller than the first average particle size or a second amount of flakes having a second average size up to 10 times smaller than the first average particle size; by introducing the treatment fluid into the well bore; and by creating a plug with the treatment fluid.

23 Claims, 13 Drawing Sheets

Related U.S. Application Data continuation of application No. 14/302,538, filed on Jun. 12, 2014, now Pat. No. 9,322,260, which is a continuation of application No. 13/105,397, filed on May 11, 2011, now Pat. No. 8,905,133.

(51) Int. Cl.
| | | |
|---|---|---|
| *C09K 8/70* | (2006.01) | |
| *C09K 8/80* | (2006.01) | |
| *E21B 43/267* | (2006.01) | |
| *E21B 43/26* | (2006.01) | |
| *E21B 21/00* | (2006.01) | |

(52) U.S. Cl.
CPC ............ *E21B 21/003* (2013.01); *E21B 43/26* (2013.01); *E21B 43/267* (2013.01); *C09K 2208/08* (2013.01)

(56) References Cited

U.S. PATENT DOCUMENTS

| | | | |
|---|---|---|---|
| 4,102,401 A | 7/1978 | Erbstoesser | |
| 4,716,964 A | 1/1988 | Erbstoesser et al. | |
| 4,832,121 A | 5/1989 | Anderson | |
| 4,848,467 A | 7/1989 | Cantu et al. | |
| 4,867,241 A | 9/1989 | Strubhar | |
| 4,951,751 A | 8/1990 | Jennings, Jr. | |
| 4,957,165 A | 9/1990 | Cantu et al. | |
| 4,986,355 A | 1/1991 | Casad et al. | |
| 5,295,393 A | 3/1994 | Thiercelin | |
| 5,862,861 A * | 1/1999 | Kalsi .................... E21B 33/12 166/192 | |
| 5,979,557 A | 11/1999 | Card et al. | |
| 6,006,838 A | 12/1999 | Whiteley et al. | |
| 6,070,666 A | 6/2000 | Montgomery | |
| 6,239,183 B1 | 5/2001 | Farmer et al. | |
| 6,399,546 B1 | 6/2002 | Chang et al. | |
| 6,435,277 B1 | 8/2002 | Qu et al. | |
| 6,506,710 B1 | 1/2003 | Hoey et al. | |
| 6,543,538 B2 | 4/2003 | Tolman et al. | |
| 6,667,280 B2 | 12/2003 | Chang et al. | |
| 6,703,352 B2 | 3/2004 | Dahayanake et al. | |
| 6,903,054 B2 | 6/2005 | Fu et al. | |
| 6,907,936 B2 | 6/2005 | Fehr et al. | |
| 6,949,491 B2 | 9/2005 | Cooke | |
| 7,036,587 B2 | 5/2006 | Munoz et al. | |
| 7,051,812 B2 | 5/2006 | McKee et al. | |
| 7,060,661 B2 | 6/2006 | Dobson et al. | |
| 7,267,170 B2 | 9/2007 | Mang et al. | |
| 7,303,018 B2 | 12/2007 | Cawiezel et al. | |
| 7,380,600 B2 | 6/2008 | Willberg et al. | |
| 7,380,602 B2 | 6/2008 | Brady et al. | |
| 7,496,258 B1 | 2/2009 | Varkey | |
| 7,506,689 B2 | 3/2009 | Surjaatmadja et al. | |
| 7,510,009 B2 | 3/2009 | Cawiezel et al. | |
| 7,565,929 B2 | 7/2009 | Bustos et al. | |
| 7,775,278 B2 | 8/2010 | Willberg et al. | |
| 7,784,541 B2 | 8/2010 | Hartman et al. | |
| 7,836,952 B2 | 11/2010 | Fripp | |
| 7,845,413 B2 | 12/2010 | Shampine et al. | |
| 8,016,034 B2 | 9/2011 | Glasbergen et al. | |
| 8,109,335 B2 | 2/2012 | Luo et al. | |
| 8,167,043 B2 | 5/2012 | Willberg et al. | |
| 8,286,703 B2 | 10/2012 | Clapp et al. | |
| 8,726,991 B2 | 5/2014 | Boney | |
| 8,905,133 B2 | 12/2014 | Potapenko et al. | |
| 9,033,041 B2 | 5/2015 | Baihly et al. | |
| 2001/0050172 A1* | 12/2001 | Tolman .................. E21B 17/203 166/297 | |
| 2002/0007949 A1 | 1/2002 | Tolman et al. | |
| 2004/0045705 A1 | 3/2004 | Gardner et al. | |
| 2005/0056418 A1 | 3/2005 | Nguyen | |
| 2005/0279501 A1 | 12/2005 | Surjaatmadja et al. | |
| 2006/0045442 A1 | 3/2006 | Varkey et al. | |
| 2006/0102342 A1 | 5/2006 | East et al. | |
| 2006/0113077 A1* | 6/2006 | Willberg .................. C09K 8/42 166/280.1 | |
| 2006/0118301 A1* | 6/2006 | East, Jr. ................. E21B 43/114 166/280.2 | |
| 2006/0175059 A1 | 8/2006 | Sinclair et al. | |
| 2006/0185848 A1 | 8/2006 | Surjaatmadja et al. | |
| 2006/0225881 A1 | 10/2006 | OShaughnessy et al. | |
| 2006/0231286 A1 | 10/2006 | Varkey | |
| 2006/0280412 A1 | 12/2006 | Varkey et al. | |
| 2007/0029086 A1* | 2/2007 | East, Jr. .................. E21B 43/14 166/278 | |
| 2007/0125163 A1 | 6/2007 | Dria et al. | |
| 2007/0131424 A1* | 6/2007 | Fripp ....................... C09K 8/80 166/280.2 | |
| 2007/0169935 A1 | 7/2007 | Akbar et al. | |
| 2007/0284109 A1 | 12/2007 | East et al. | |
| 2008/0000638 A1 | 1/2008 | Burukhin et al. | |
| 2008/0053657 A1* | 3/2008 | Alary .................... C04B 35/111 166/280.2 | |
| 2008/0056639 A1 | 3/2008 | MacDougall et al. | |
| 2008/0066910 A1* | 3/2008 | Alary ....................... C09K 8/80 166/280.2 | |
| 2008/0078548 A1 | 4/2008 | Pauls et al. | |
| 2008/0093073 A1 | 4/2008 | Bustos et al. | |
| 2008/0156498 A1 | 7/2008 | Phi et al. | |
| 2008/0196896 A1* | 8/2008 | Bustos .................. E21B 43/267 166/281 | |
| 2008/0210423 A1 | 9/2008 | Boney | |
| 2008/0280788 A1 | 11/2008 | Parris et al. | |
| 2008/0280790 A1 | 11/2008 | Mirakyan et al. | |
| 2009/0025934 A1* | 1/2009 | Hartman ................. C09K 8/536 166/280.2 | |
| 2009/0032258 A1 | 2/2009 | Chang et al. | |
| 2009/0054269 A1* | 2/2009 | Chatterji ................ C09K 8/487 507/104 | |
| 2009/0062154 A1* | 3/2009 | Windebank .............. C09K 8/62 507/203 | |
| 2009/0145610 A1 | 6/2009 | Varkey et al. | |
| 2009/0178807 A1* | 7/2009 | Kaufman ................ C09K 8/80 166/276 | |
| 2009/0196557 A1 | 8/2009 | Varkey et al. | |
| 2009/0218094 A1 | 9/2009 | McLeod et al. | |
| 2009/0283258 A1 | 11/2009 | Poitzsch et al. | |
| 2010/0212906 A1 | 8/2010 | Fulton et al. | |
| 2010/0267591 A1 | 10/2010 | Todd et al. | |
| 2011/0090496 A1 | 4/2011 | Samson et al. | |
| 2012/0048570 A1 | 3/2012 | Hansen | |
| 2012/0085531 A1 | 4/2012 | Leising et al. | |
| 2012/0168163 A1 | 7/2012 | Bertoja et al. | |
| 2012/0181034 A1 | 7/2012 | Bour et al. | |
| 2012/0217014 A1 | 8/2012 | Groves | |
| 2012/0285692 A1 | 11/2012 | Potapenko et al. | |
| 2013/0048282 A1 | 2/2013 | Adams et al. | |
| 2013/0062063 A1 | 3/2013 | Baihly et al. | |
| 2013/0264054 A1 | 10/2013 | East et al. | |
| 2013/0264056 A1 | 10/2013 | Stout | |
| 2013/0270011 A1 | 10/2013 | Akkurt et al. | |
| 2014/0014371 A1 | 1/2014 | Jacob et al. | |
| 2014/0096950 A1 | 4/2014 | Pyecroft et al. | |
| 2014/0116701 A1 | 5/2014 | Tang | |
| 2014/0138087 A1 | 5/2014 | Gupta | |
| 2014/0144224 A1 | 5/2014 | Hoffman et al. | |
| 2014/0144226 A1 | 5/2014 | Shanks | |
| 2014/0196893 A1 | 7/2014 | Vigneaux | |

(56) References Cited

U.S. PATENT DOCUMENTS

| | | | |
|---|---|---|---|
| 2014/0202708 | A1 | 7/2014 | Jacob et al. |
| 2014/0290945 | A1 | 10/2014 | Potapenko et al. |
| 2014/0358444 | A1 | 12/2014 | Friehauf et al. |
| 2015/0041132 | A1 | 2/2015 | Nelson et al. |
| 2015/0122541 | A1 | 5/2015 | Varkey et al. |
| 2015/0129229 | A1 | 5/2015 | Ring et al. |
| 2015/0144347 | A1 | 5/2015 | Brannon et al. |
| 2016/0024902 | A1 | 1/2016 | Richter et al. |
| 2018/0022987 | A1 | 1/2018 | Ortega Andrade et al. |

FOREIGN PATENT DOCUMENTS

| | | | |
|---|---|---|---|
| WO | 2006014951 | A2 | 2/2006 |
| WO | 2009088317 | A1 | 7/2009 |
| WO | 2012058296 | A2 | 5/2012 |
| WO | 2012170382 | A1 | 12/2012 |
| WO | 2013009773 | A1 | 1/2013 |
| WO | 2013112811 | A1 | 8/2013 |
| WO | 2014099207 | A1 | 6/2014 |
| WO | 2015020656 | A1 | 2/2015 |
| WO | 2015061655 | A2 | 4/2015 |
| WO | 2016076747 | A1 | 5/2016 |
| WO | 2016077354 | A1 | 5/2016 |

OTHER PUBLICATIONS

Arguijo et al., "Streamlined Completions Process: An Eagle Ford Shale Case History", SPE 162658, 2012 SPE Canadian Unconventional Resources Conference, Oct. 30-Nov. 1, 2012, 17 pages.

Aviles et al., Application and Benefits of Degradable Technology in Open-hole Fracturing, SPE 166528, SPE Annual Technical Conference and Exhibition, Sep. 30-Oct. 2, 2013, 9 pages.

Badri et al., "Key to the Success Application of Hydraulic Fracturing in an Emerging Coalbed Methane Prospect—An Example from the Peat Coals of Australia", SPE-64493, SPE Asia Pacific Oil and Gas Conference and Exhibition, Oct. 16-18, 2000, 15 pages.

Barko et al., "Field and laboratory experience in closed fracture acidizing the Lisburne field, Prudhoe Bay, Alaska", SPE 24855, 67th Annual Technical Conference and Exhibition of the Society of Petroleum Engineers, Oct. 4-7, 1992, pp. 923-931.

Bell et al., "Effective diverting on horizontal wells in the Austin Chalk", SPE 26582, 68th Annual Technical Conference and Exhibition of the Society of Petroleum Engineers, Oct. 3-6, 1993, pp. 725-738.

Bellarby et al., "Design and implementation of a high rate acid stimulation through a subsea intelligent completion", SPE 83950, Offshore Europe 2003, Sep. 2-5, 2003, 10 pages.

Blinten et al., "Stimulating very long gross intervals", SPE 13709, SPE 1985 Middle East Oil Technical Conference and Exhibition, Mar. 11-14, 1985, pp. 12 pages.

Brown et al., "Factors influencing optimum ball sealer performance", Journal of Petroleum Technology, 1963, vol. April, pp. 450-454.

Cipolla et al., "New Algorithms and Integrated Workflow for Tight Gas and Shale Completions", SPE 146872, SPE Annual Technical Conference and Exhibition, Oct. 30-Nov. 2, 2011, 18 pages.

Cramer, "Stimulating Unconventional Reservoirs: Lessons Learned, Successful Practices, Areas for Improvement", SPE 114172, 2008 SPE Unconventional Reservoirs Conference, Feb. 10-12, 2008, 19 pages.

Doerler et al., "Diverting agents: laboratory study and modeling of resultant zone injectivities", SPE 16250, SPE International Symposium on Oilfield Chemistry, Feb. 4-6, 1987, pp. 45-56.

East, Jr. et al., "Hydrajet Perforating and Proppant Plug Diversion in Multi-Interval Horizontal Well Fracture Stimulation: Case Histories", SPE 114881, 2008 SPE Tight Gas Completions Conference, Jun. 9-11, 2008, 17 pages.

Eberhard et al., "Application of flow-thru composite frac plugs in tight-gas sand completions", SPE 84328, SPE Annual Technical Conference and Exhibition, Oct. 5-8, 2003, 10 pages.

Edlund et al., "Degradable Polymer Microspheres for Controlled Drug Delivery", Advances in Polymer Science: Degradable Aliphatic Polyesters, 2002, pp. 67-112, vol. 157.

Emanuele et al., "A Case Study: Completion and Stimulation of Horizontal Wells with Multiple Transverse Hydraulic Fractures in the Lost Hills Diatomite", SPE 46193, 1998 SPE Western Regional Meeting, May 10-13, 1998, 13 pages.

Erbstoesser, "Improved ball sealer diversion", Journal of Petroleum Technology, Nov. 1980, pp. 1903-1910.

Gabriel et al., "The design of buoyant ball sealer treatments", SPE 13085, 59th Annual Technical Conference and Exhibition, Sep. 16-19, 1984, 12 pages.

Gall, "Steam diversion by surfactants", SPE 14390, 60th Annual Technical Conference and Exhibition of the Society of Petroleum Engineers, Sep. 22-25, 1985, 9 pages.

Gallus et al., "Deformable diverting agent for improved well stimulation", Journal of Petroleum Technology. Apr. 1969, SPE 2161, pp. 497-504.

Gallus et al., "Fluid diversion to improve well stimulation", SPE 3811, American Institute of Mining, Metallurgical, and Petroleum Engineers, 1972, 16 pages.

Glasbergen et al., "Design and field testing of a truly novel diverting agent", SPE 102606, 2006 SPE Annual Technical Conference and Exhibition, Sep. 24-27, 2006, 20 pages.

Hakkarainen, "Aliphatic Polyesters: Abiotic and Biotic Degradation and Degradation Products", Advances in Polymer Science: Degradable Aliphatic Polyesters, 2002, pp. 113-138, vol. 157.

Hannah, "New fracturing technique leads to improved performance in the Mississippian trend" Journal of Petroleum Technology . 1976, vol. August, SPE 5628, pp. 859-864.

Harrison, "Diverting Agents—History and Application", Journal of Petroleum Technology,1972, pp. 593-598.

Hewett et al., "Induced Stress Diversion: A Novel Approach to Fracturing Multiple Pay Sads of the NBU Field, Uintah Co., Utah", SPE 39945, 1998 SPE Rocky Mountain Regional/Low-Permeability Reservoirs Symposium and Exhibition, Apr. 5-8, 1998, pp. 375-383.

Hill et al., "Laboratory and theoretical modeling of diverting agent behavior", Journal of Petroleum Technology, 1984, vol. July, pp. 1157-1163.

Hu et al., "Evaluation of a-olefin sulfonates for steam diversion", SPE/DOE 12660, SPE/DOE Fourth Symposium on Enhanced Oil Recovery, Apr. 15-18, 1984, 14 pages.

Huang et al., U.S. Appl. No. 14/946,085, filed Nov. 19, 2015; 22 pages.

International Search Report and Written Opinion issued in in International Patent Appl. No. PCT/US2016/030491 dated Aug. 3, 2016; 17 pages.

International Search Report issued in International Patent Appl. No. PCT/US2015/041220 dated Oct. 8, 2015; 3 pages.

Johnson et al., "Large-Volume, High-Rate Stimulation Treatments in Horizontal Wells in the Niobara Formation, Silo Field, Laramie Country, Wyoming", SPE 25926, SPE Rocky Mountain Regional/ Low Permeability Reservoirs Symposium, Apr. 12-14, 1993, 14 pages.

Kamal, "Fiber Optic Sensing: Evolution to Value", SPE 167907-MS, SPE Intelligent Energy Conference and Exhibition, Apr. 1-3, 2014, 9 pages.

Kraemer et al., "A Novel Completion Method for Sequenced Fracturing in the Eagle Ford Shale", SPE 169010-ME, SPE Unconventional Resources Conference, Apr. 1-3, 2014, 10 pages.

Li et al., "Multi-stage fracturing stimulations improve well performance in tight oil reservoirs of the Changing Oilfields", IPTC 12303, International Petroleum Technology Conference, Dec. 3-5, 2008, 8 pages.

Lonnes et al., "Advanced multizone stimulation technology", SPE 95778, 2005 SPE Annual Technical Conference end Exhibition, Oct. 9-12, 2005, 7 pages.

McDaniel et al., "Stimulation Techniques for Low Permeability Reservoirs with Horizontal Completions that Do Not Have Cemented Casing", SPE-75688, SPE Gas Technology Symposium, Apr. 30-May 2, 2002, 14 pages.

(56) References Cited

OTHER PUBLICATIONS

Morgenthaler et al., "Model wellbore evaluation of diverter effectiveness confirmed by field results", SPE 31140, SPE International Symposium on Formation Damage Control, Feb. 14-15, 1996, 8 pages.
Nasr-El-Din et al., "Laboratory evaluation of biosealers", SPE 65017, 2001 SPE International Symposium on Oilfield Chemistry, Feb. 13-16, 2001, 11 pages.
Nitters et al., "Granular diverting agents selection, design and performance", SPE 18884, SPE Production Operations Symposium, Mar. 13-14, 1989, pp. 531-538.
Paccaloni, "A new, effective matrix stimulation diversion technique", SPE Production&Facilities. 1995, vol. August, pp. 151-156.
Pongratz et al., "Optimizing matrix acid treatments in multilayered reservoir in Russia by applying different diversion techniques", SPE 94485, SPE European Formation Damage Conference, May 25-27, 2005, 15 pages.
Potapenko et al., "Barnett shale refracture stimulations using a novel diversion technique", SPE 119636, 2009 SPE Hydraulic Fracturing Technoloyg Conference, Jan. 19-21, 2009, 11 pages.
Pritchett et al., "Completion of the KCC 378-H: A case study", SPE 23948, 1992 SPE Permian Basin Oil and Gas Recovery Conference, Mar. 18-20, 1992, pp. 189-202.
Rees et al., "Successful Hydrajet Acid Squeeze and Multifracture Acid Treatments in Horizontal Open Hole Using Dynamic Diversion Process and Downhole Mixing", SPE 71692, 2001 SPE Annual Technology Conference, Sep. 30, 2001, 13 pages.
Smith et al., "New diverting techniques for acidizing and fracturing", SPE 2751, Society of Petroleum Engineers of AIME, 1969, 8 pages.
Stipp et al., "Pseudolimited entry: A sand fracturing technique for simultaneous treatment of multiple pays", SPE 1903, Society of Petroleum Engineers, 1968, 6 pages.
Strassner et al., "Laboratoory/field study of oil-soluble resin-diverting agents in Prudhow Bay, Alaska, Acidizing Operations", SPE 20622, 65th Annual Technical Conference and Exhibition of the Society of Petroleum Engineers, Sep. 23-26, 1990, pp. 77-86.
Stridsberg et al., "Controlled Ring-Opening Polymerization: Polymers with designed Macromolecular Architecture", Advances in Polymer Science: Degradable Aliphatic Polyesters, 2002, pp. 41-46, vol. 157.
Surjaatmadja et al., "Successful Acid Treatments in Horizontal Openholes Using Dynamic Diversion and Instant Response Downhole Mixing—An In-Depth Postjob Evaluation", SPE 75522, SPE Gas Technology Symposium, Apr. 30-May 2, 2002, 11 pages.
Surjaatmadja et al., "Successful Acid Treatments in Horizontal Openholes Using Dynamic Diversion and Downhole Mixing—An in Depth Postjob Evaluation", SPE 75221, SPE/DOE Improved Oil Recovery Symposium, Apr. 13-17, 2002, 10 pages.
Written Opinion issued in International Patent Appl. No. PCT/US2015/041220 dated Oct. 8, 2015; 7 pages.
Zimmerman et al., "Selection of tools for stimulation in horizontal cased hole", SPE 18995, SPE joint Rocky Mountain Regional/Low Permeability Reservoirs Symposium and Exhibition, Mar. 6-8, 1989, pp. 629-640.
Schlumberger Oilfield Glossary entries for "casing", "casing joint" and "casing string", accessed Jun. 10, 2017 via www.glossary.oilfield.slb.com, 3 pages.
Schlumberger Oilfield Glossary entries for "diversion" and "chemical diversion", accessed Jun. 10, 2017 via www.glossary.oilfield.slb.com, 2 pages.
Schlumberger Oilfield Glossary entries for "bridge plug", accessed Jun. 10, 2017 via www.glossary.oilfield.slb.com, 1 page.
Schlumberger Oilfield Glossary entries for "bullheading", accessed Jun. 6, 2017 via www.glossary.oilfield.slb.com, 1 page.
Schlumberger Oilfield Glossary entries for "spotting", accessed Jun. 6, 2017 via www.glossary.oilfield.slb.com, 1 page.
International Search Report and Written Opinion issued in International Patent Appl. No. PCT/US2017/062123 dated Feb. 22, 2018; 13 pages.

\* cited by examiner

A.

B.

C.

A.

B.

METHODS OF ZONAL ISOLATION AND TREATMENT DIVERSION

CROSS-REFERENCE TO RELATED APPLICATION(S)

This application claims priority as a continuation-in-part application of U.S. patent application Ser. No. 15/083,892, filed Mar. 29, 2016, which is a continuation of U.S. Pat. No. 9,322,260, granted Apr. 26, 2016, which is a continuation of U.S. Pat. No. 8,905,133, granted Dec. 9, 2014. The disclosures of the priority applications are hereby incorporated by reference herein in its entirety.

BACKGROUND

The statements in this section merely provide background information related to the present disclosure and may not constitute prior art.

Some embodiments relate to methods applied to a well bore penetrating a subterranean formation, and more particularly, methods for zonal isolation.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

In hydraulic and acid fracturing, a first, viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. These types of materials are well known to those skilled in the art. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing can be done without a highly viscosified fluid (i.e., slick water) to minimize the damage caused by polymers or the cost of other viscosifiers.

Hydraulic and acid fracturing of horizontal wells as well as multi-layered formations frequently requires using diverting techniques in order to enable fracturing redirection between different zones. The list of these diverting methods includes, but not limited to, using mechanical isolation devises such as packers and well bore plugs, setting bridge plugs, pumping ball sealers, pumping slurred benzoic acid flakes and removable/degradable particulates. As well, other treatment may require use of diverting techniques.

Treatment diversion with particulates is typically based on bridging of particles of the diverting material behind casing and forming a plug by accumulating the rest of the particles at the formed bridge. Several typical problems related to treatment diversion with particulate materials are: reducing bridging ability of diverting slurry during pumping because of dilution with well bore fluid (interface mixing), necessity of using relatively large amount of diverting materials, and poor stability of some diverting agents during pumping and during subsequent treatment stage.

On the other way, during the drilling of a well bore, various fluids are typically used in the well for a variety of functions. The fluids may be circulated through a drill pipe and drill bit into the well bore, and then may subsequently flow upward through the well bore to the surface. During this circulation, the drilling fluid may act to remove drill cuttings from the bottom of the hole to the surface, to suspend cuttings and weighting material when circulation is interrupted, to control subsurface pressures, to maintain the integrity of the well bore until the well section is cased and cemented, to isolate the fluids from the formation by providing sufficient hydrostatic pressure to prevent the ingress of formation fluids into the well bore, to cool and lubricate the drill string and bit, and/or to maximize penetration rate.

Lost circulation is a recurring drilling problem, characterized by loss of drilling mud into downhole formations. It can occur naturally in formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Lost circulation is frequently controlled by including an additive in fluids injected into well bores. The most common additive used to control or cease lost circulation is bentonite which will seal small holes or fractures. Bentonite, in higher concentrations, increases viscosity and slows the fluid flow into the surrounding rock. Other solids, such as ground paper, ground corn cobs and sawdust, have also been used to control fluid loss. Polymers are also sometimes used to increase the viscosity of a well bore fluid and to control fluid loss. Polymer additives, however, are generally more expensive than particulates such as bentonite.

Methods disclosed herewith offer a new way to create diverting techniques, zonal isolation or techniques thereof.

SUMMARY

In a first aspect, a method of treating a subterranean formation penetrated by a well bore is disclosed. The method provides a treatment fluid including a blend, the blend including a first amount of particulates having a first average particle size between about 3 mm and 2 cm and a second amount of particulates having a second average size between about 1.6 and 20 times smaller than the first average particle size or a second amount of flakes having a second average size up to 10 times smaller than the first average particle size; introducing the treatment fluid into the well bore; and creating a plug with the treatment fluid wherein the second amount of particulates comprises a proppant. Also in another embodiment, the second average size is between about 2 and 10 times smaller than the first average particle size.

In a second aspect, another method of treating a subterranean formation penetrated by a well bore is disclosed. The well bore may contain a casing and at least one hole in the casing, the hole having a diameter. The method provides a treatment fluid including a blend which has a first amount of particulates having a first average particle size between about 50 to 100% of the diameter and a second amount of particulates having a second average size between about 1.6 and 20 times smaller than the first average particle size or a second amount of flakes having a second average size up to 10 times smaller than the first average particle size; introducing the treatment fluid into the hole; creating a plug with said treatment fluid behind casing in the vicinity to the hole or in the hole; and removing the plug wherein the second amount of particulates comprises a proppant. Also, in another embodiment, the second average size is between about 2 and 10 times smaller than the first average particle size.

In a third aspect, a method of fracturing a subterranean formation penetrated by a well bore is disclosed. The well bore contains a casing and at least one hole on said casing, the hole having a diameter. The method provides a diverting fluid including a blend having a first amount of particulates with a first average particle size between about 50 to 100% of said diameter and a second amount of particulates having a second average size between about 1.6 and 20 times smaller than the first average particle size or a second amount of flakes having a second average size up to 10 times smaller than the first average particle size; introducing the diverting fluid into the hole; creating a diverting plug utilizing the diverting fluid behind casing in the vicinity to the hole or in the hole; fracturing the subterranean formation; and removing the diverting plug wherein the second amount of particulates comprises a proppant. Also in another embodiment, the second average size is between about 2 and 10 times smaller than the first average particle size.

BRIEF DESCRIPTION OF THE DRAWINGS

FIG. 1A shows particles with ratio between largest and smallest dimensions (aspect ratio) x/y<3;

FIG. 1C shows illustration for definitions of particle and flake size.

FIG. 1b shows various illustrations for definitions for holes. FIG. 1bA shows holes with various geometry; FIG. 1bB shows illustration for definitions of hole diameter or hole size.

DETAILED DESCRIPTION

Figure 1:
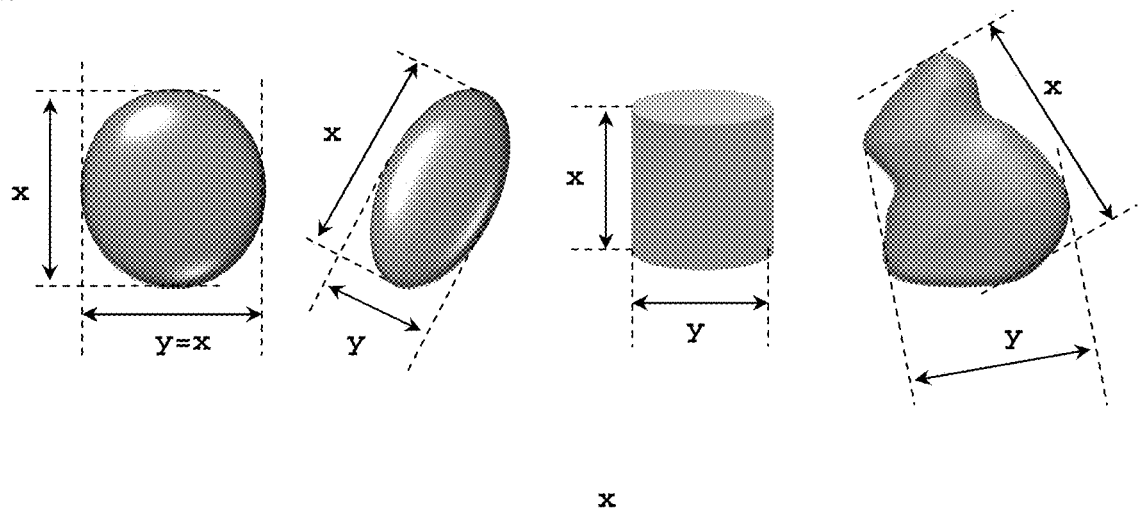
FIG. 1 shows various illustrations for definitions for particles and flakes.
Figure 1:
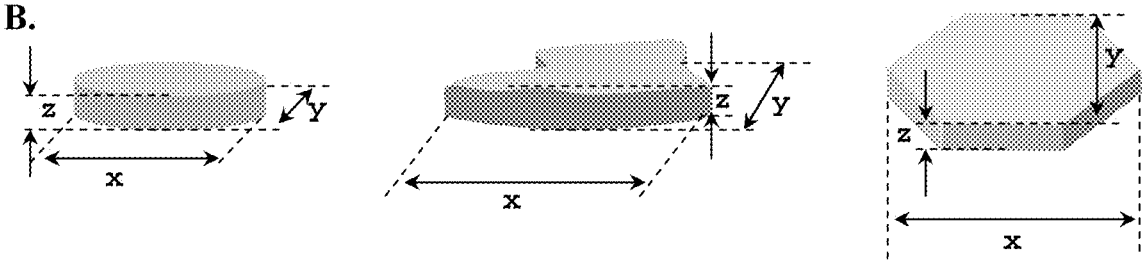
Figure 1:
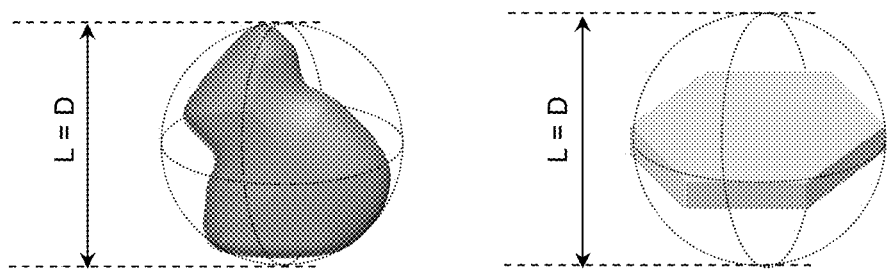

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e., the rock formation around a well bore, by pumping fluid at very high pressures (pressure above the determined closure pressure of the formation), in order to increase production rates from a hydrocarbon reservoir. The fracturing methods otherwise use conventional techniques known in the art.

The term "particulate" or "particle" refers to a solid 3D object with maximal dimension significantly less than 1 meter. Here "dimension" of the object refers to the distance between two arbitrary parallel planes, each plane touching the surface of the object at least one point. The maximal dimension refers to the biggest distance existing for the object between any two parallel planes and the minimal dimension refers to the smallest distance existing for the object between any two parallel planes. In some embodiments, the particulates used are with a ratio between the maximal and the minimal dimensions (particle aspect ratio x/y) of less than 5 or even of less than 3 (see FIG. 1A).

The term "flake" refers to special type of particulate as defined above. The flake is a solid 3D object having a thickness smaller than its other dimensions, for example its length and width. Flake aspect ratios (diameter/thickness, length/thickness, width/thickness, etc. . . . ) may be in the range of from about 5 to about 50 or more (see FIG. 1B). For the flake, inventors define the flake aspect ratio as the ratio of the length or width to the thickness. Any suitable ratio of length to width may be used.

For the purposes of the disclosure, particles and flakes may have homogeneous structure or may also be non-homogeneous such as porous or made of composite materials.

The term "particle size", "particulate size" or "flake size" refers to the diameter of the smallest imaginary circumscribed sphere which includes such particulate or flake as shown in FIG. 1C.

The term "average size" refers to an average size of solids in a group of solids of each type. In each group j of particles or flakes average size can be calculated as mass-weighted value $$\bar{L}_j = \frac{\sum_{i=1}^{N} l_i m_i}{\sum_{i=1}^{N} m_i}$$

Where N—number of particles or flakes in the group, $l_i$, (i=1 . . . N)—sizes of individual particles or flakes; $m_i$ (i=1 . . . N)—masses of individual particles or flakes.

Figure 1B:
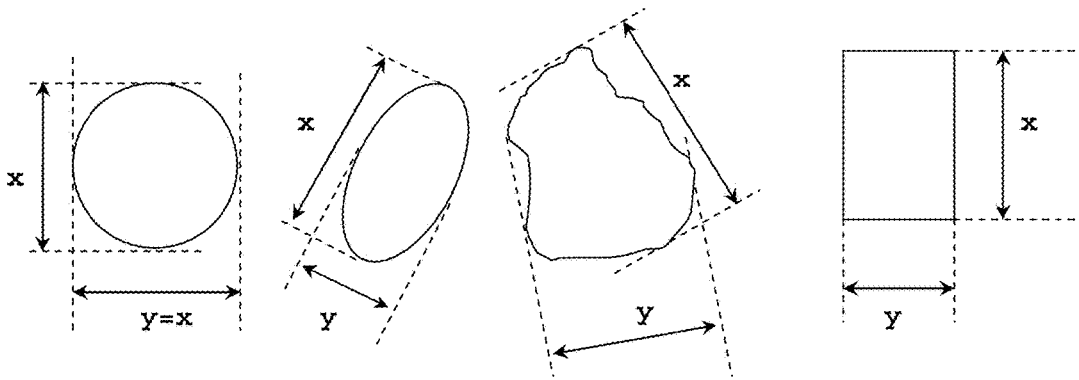
FIG. 1B shows flakes x, y and z refer to length, width and thickness respectively.
Figure 1B:
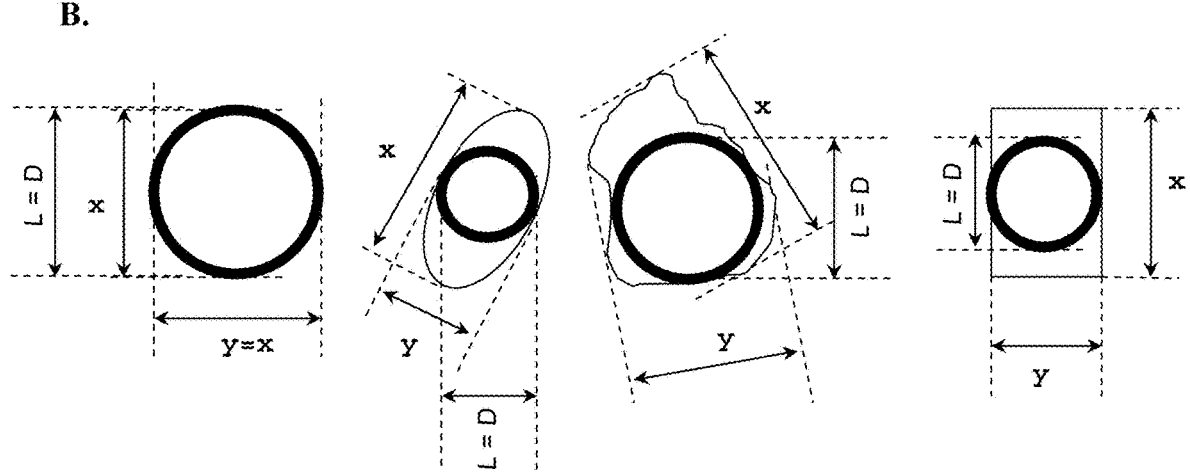

The term "hole" refers to a 2D object of any geometry defined only by its perimeter as shown in FIG. 1bA. The term "hole diameter" or "hole size" refers to the diameter of the biggest imaginary circle which is included in such hole as shown in FIG. 1bB.

While the embodiments described herewith refer to well treatment it is equally applicable to any well operations where zonal isolation is required such as drilling operations, workover operations etc.

A method of treatment for diversion or for temporally zonal isolation is disclosed. The method uses a composition made of blends of particles or blends of particles and flakes. According to an embodiment, the size of the largest particles or flakes in the blends is slightly smaller than the diameter of perforation holes in the zone to isolate or divert. According to a further embodiment, the size of the particles or flakes in the blends is larger than an average width of the void intended to be closed or temporally isolated. The average width of the void is the smallest width of the void after the perforation hole or another entry in such void, at 10 cm, at 20 cm, at 30 cm or at 50 cm or at 500 cm (when going into the formation from the well bore). Such void may be a perforation tunnel, hydraulic fracture or wormhole. Introducing such blends composition into perforation holes results in jamming largest particles in the voids in the proximity of the well bore. Thereafter there is an accumulation of other particles on the formed bridge. In one embodiment, the ratio between particles and flakes in the blends are designed to reduce permeability of the formed plugs.

According to one aspect of the embodiment, the blends composition enables zonal isolation by creating plugs in the proximity to well bore. In comparison to traditional treatment diversion techniques, the blends composition requires lower amount of diverting material. As well, the following benefits exist: lower risk of well bore plugging, lower risk of formation damage, and better clean up. In the example where the diverting blend is designed for sealing perforation tunnels (e.g. slick-water treatments) the amount of diverting material required for treatment diversion between several perforation clusters may be as low as several kilograms. Further removal of the diverting material is achieved either by self-degradation at downhole conditions or by introducing special chemical agents or by well bore intervention.

The composition is made of blends of particles or blends of particles and flakes in a carrier fluid. The carrier fluid may be water: fresh water, produced water, seawater. Other non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

The particle(s) or the flake(s) can be embodied as proppant. Proppant selection involves many compromises imposed by economical and practical considerations. Such proppants can be natural or synthetic (including but not limited to glass beads, ceramic beads, sand, polymeric and bauxite), coated, or contain chemicals; more than one can be used sequentially or in mixtures of different sizes or different materials. The proppant may be resin coated (curable), or pre-cured resin coated. Proppants and gravels in the same or different wells or treatments can be the same material and/or the same size as one another and the term proppant is intended to include gravel in this disclosure. In some embodiments, irregular shaped particles may be used. International application WO 2009/088317 discloses a method of fracturing with a slurry of proppant containing from 1 to 100 percent of stiff, low elasticity, low deformability elongated particles. US patent application 2007/768393 discloses proppant that is in the form of generally rigid, elastic plate-like particles having a maximum to minimum dimension ratio of more than about 5, the proppant being at least one of formed from a corrosion resistant material or having a corrosion resistant material formed thereon. Each of the above are herein incorporated by reference.

Figure 12:
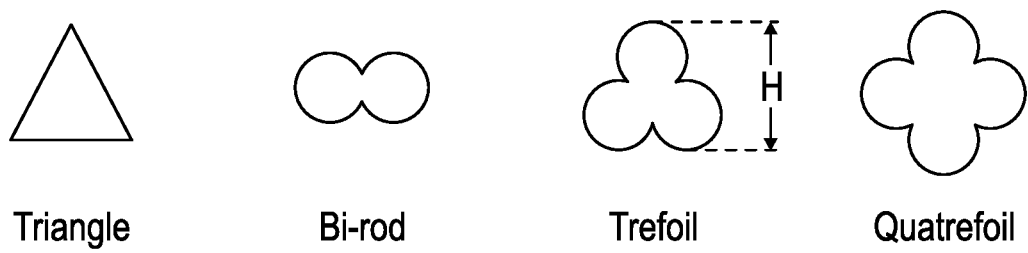
FIG. 12 shows various cross sections for the particulate.

The proppant or particle(s) may also have a specific shape (referred to herein as specific-shaped particulates) to enhance the bridging capability and stability of the diversion plug. The specific-shaped particulates may have a rod or tube shape with a cross section such as, for example, a triangle, bi-rod shape, trefoil, and quatrefoil. See FIG. 12. The present inventors believe that incorporating a specific-shaped particulate, such a particulate having a trefoil shaped cross section, may (1) enhance the bridging capability of the composition due to enhanced friction forces between the particulate and the confining geometry of the perforation holes and voids behind the casing, (2) enhance the plug stability due to the enhanced friction forces and the better interaction of the particulate with the fibers and (3) act as proppant in the voids behind the casing prone to closure.

The average thickness of the specific-shaped particulates may be from about 0.1 mm to about 12.5 mm, such as, for example, from about 0.25 mm to about 5 mm, from about 0.5 mm to about 4 mm, from about 1 mm to about 3 mm and from about 1.5 mm to about 3 mm. The average aspect ratio of length over thickness of the specific-shaped particulates may be from about 1 to about 6, such as, for example, from about 1 to about 5 and from about 1.5 to about 4.

The particle(s) or the flake(s) can be embodied as degradable material. Nonlimiting examples of degradable materials that may be used include certain polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

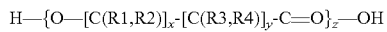

where,

R1, R2, R3, R4 is either H, linear alkyl, such as $CH_3$, $CH_2CH_3$ $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly (lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acil chloride, malonyl chloride, fumaroil chloride, maleyl chloride, succinyl chloride, glutaroyl chloride, adipoil chloride, phthaloil chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicaboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters is:

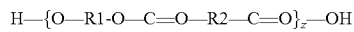

where,

R1 and R2, are linear alkyl, branched alkyl, aryl, alkylaryl groups; and z is an integer between 2 and 50,000.

Other examples of suitable polymeric acid precursors are the polyesters derived from phtalic acid derivatives such as polyethylenetherephthalate (PET), polybutylentetherephthalate (PBT), polyethylenenaphthalate (PEN), and the like.

In the appropriate conditions (pH, temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The break down of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Some suitable examples of solid polymeric acid precursor material that may be used include, but are not limited to, those described in the publication of Advances in Polymer Science, Vol. 157 entitled "Degradable Aliphatic Polyesters," edited by A. C. Albertsson, pages 1-138. Examples of polyesters that may be used include homopolymers, random, block, graft, and star- and hyper-branched aliphatic polyesters.

Another class of suitable solid polymeric acid precursor material that may be used includes polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a nonlimiting example of such byproducts. Nonlimiting examples of suitable polyamides include proteins, polyaminoacids, nylon, and poly(caprolactam). Another class of polymers that may be suitable for use are those polymers that may contain hydrolyzable groups, not in the polymer backbone, but as pendant groups. Hydrolysis of the pendant groups may generate a water-soluble polymer and other byproducts that may become sorbed into the cement composition. A nonlimiting example of such a polymer includes polyvinylacetate, which upon hydrolysis forms water-soluble polyvinylalcohol and acetate salts.

The particle(s) or the flake(s) can be embodied as material reacting with chemical agents. Some examples of materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (can be hydrolyzed with acids and bases); active metals such as magnesium, aluminum, zinc and their alloys (reactive to water, acids and bases) etc. Particles and flakes may also be embodied as material that accelerate degradation of other component of the formed plug. Some non-limited examples of it is using metal oxides (e.g. MgO) or bases (e.g. $Mg(OH)_2$; $Ca(OH)_2$) or salts of weak acids (e.g. $CaCO_3$) for accelerating hydrolysis of polyesters such as polylactic or polyglycolic acids.

The particle(s) or the flake(s) can be embodied as melting material. Examples of meltable materials that can be melted at downhole conditions hydrocarbons with number of carbon atoms >30; polycaprolactones; paraffin and waxes; carboxylic acids such as benzoic acid and its derivatives; etc. Wax particles can be used. The particles are solid at the temperature of the injected fluid, and that fluid cools the formation sufficiently that the particles enter the formation and remain solid. Aqueous wax are commonly used in wood coatings; engineered wood processing; paper and paperboard converting; protective architectural and industrial coatings; paper coatings; rubber and plastics; inks; textiles; ceramics; and others. They are made by such companies as Hercules Incorporated, Wilmington, Del., U.S.A., under the trade name PARACOL®, Michelman, Cincinnati, Ohio, U.S. A., under the trade name MICHEM®, and ChemCor, Chester, N.Y., U.S.A. Particularly suitable waxes include those commonly used in commercial car washes. In addition to paraffin waxes, other waxes, such as polyethylenes and polypropylenes, may also be used.

The particle(s) or the flake(s) can be embodied as water-soluble material or hydrocarbon-soluble material. The list of the materials that can be used for dissolving in water includes water-soluble polymers, water-soluble elastomers, carbonic acids, rock salt, amines, inorganic salts). List of the materials that can be used for dissolving in oil includes oil-soluble polymers, oil-soluble resins, oil-soluble elastomers, polyethylene, carbonic acids, amines, waxes).

The particle(s) and the flake(s) size are chosen so the size of the largest particles or flakes is slightly smaller than the diameter of the perforation holes in casing and larger than the average width of the voids behind casing (perforation tunnels, fractures or wormholes). By perforation hole, we mean any type of hole present in the casing. This hole can be a perforation, a jetted hole, hole from a slotted liner, port or any opening in a completion tool, casing fluid exit point. According to a further embodiment, the size of particles or flakes in the blend is designed for reducing permeability of the plugs in the narrow voids behind casing (perforation tunnels, fractures or wormholes). In general the particle or flake used will have an average particle size of less than several centimeters, preferably less than 2 cm, and more preferably less than 1 cm. In one embodiment, some particle or flake will have an average particle size of from about 0.04 mm to about 4.76 mm (about 325 to about 4 U.S. mesh), preferably from about 0.10 mm to about 4.76 mm (about 140 to about 4 U.S. mesh), more preferably from about 0.15 mm to about 3.36 mm (about 100 to about 6 U.S. mesh) or from about 2 mm to about 12 mm.

According to a further embodiment, the particles blend or the particles/flakes blend composition contains particles or flakes with different particles/flakes size distribution. In one embodiment, the composition comprises particulate materials with defined particles size distribution. On example of realization is disclosed in U.S. Pat. No. 7,784,541, herewith incorporated by reference in its entirety.

In certain embodiments, the selection of the size for the first amount of particulates is dependent upon the characteristics of the perforated hole as described above: the size of the largest particles or flakes is slightly smaller than the diameter of the perforation holes in casing. In certain further embodiments, the selection of the size of the first amount of particulates is dependent upon the void behind casing: the size of the particles is larger than the average width of the voids behind casing (perforation tunnels, fractures or wormholes). In certain further embodiments, the selection of the size for the first amount of particulates is dependent upon the characteristics of the perforated hole and the void behind casing: the size of the largest particles or flakes is slightly smaller than the diameter of the perforation holes in casing and larger than the average width of the voids behind casing (perforation tunnels, fractures or wormholes). In certain further embodiments, the selection of the size for the first amount of particulates is dependent upon the characteristics of the desired fluid loss characteristics of the first amount of particulates as a fluid loss agent, the size of pores in the formation, and/or the commercially available sizes of particulates of the type comprising the first amount of particulates. The first average particle size is between about 100 micrometers and 2 cm, or between about 100 micrometers and 1 cm or between about 400 micrometers and 1000 micrometers, or between about 3000 micrometers and 10000 micrometers, or between about 6 millimeters and 10 millimeters, or between about 6 millimeters and 8 millimeters. Also in some embodiments, the same chemistry can be used for the first average particle size. Also in some embodiments, different chemistry can be used for the same first average particle size: e.g. in the first average particle size, half of the amount is proppant and the other half is resin coated proppant.

In certain embodiments, the selection of the size for the second amount of particulates is dependent upon the characteristics of the desired fluid loss characteristics of the second amount of particulates as a fluid loss agent, the size of pores in the formation, and/or the commercially available sizes of particulates of the type comprising the second amount of particulates.

In certain embodiments, the selection of the size of the second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. The particles size distribution required for maximizing PVF in narrow slot may be different from the particles size distribution required for maximizing PVF in a continuum system, this can be seen in FIGS. 3 and 4. Therefore, in certain embodiments, the selection of the size of the second amount of particulates is dependent upon maximizing or optimizing a packed volume fraction (PVF) of the mixture of the first amount of particulates and the second amount of particulates in narrow voids between 2 mm and 2 cm. In certain embodiments, the selection of the size of the second amount of particulates is dependent upon maximizing or optimizing a packed volume fraction (PVF) of the mixture of the first amount of particulates and the second amount of particulates in a fracture or slot with width of less than 20 mm. A second average particle size of between about two to ten times smaller than the first amount of particulates contributes to maximizing the PVF of the mixture or the mixture placed in the void to plug, or the mixture placed in a fracture or slot with width of less than 20 mm, but a size between about three to twenty times smaller, and in certain embodiments between about three to fifteen times smaller, and in certain embodiments between about three to ten times smaller will provide a sufficient PVF for most storable compositions. Further, the selection of the size of the second amount of particulates is dependent upon the composition and commercial availability of particulates of the type comprising the second amount of particulates. In certain embodiments, the particulates combine to have a PVF above 0.74 or 0.75 or above 0.80. In certain further embodiments the particulates may have a much higher PVF approaching 0.95.

In certain embodiments, the selection of the size for the second amount of flakes is dependent upon the characteristics of the desired fluid loss characteristics of the second amount of flakes as a fluid loss agent, the size of pores in the formation, and/or the commercially available sizes of flakes of the type comprising the second amount of flakes. The flake size is in the range of 10-100% of the size of the first amount of particulate, more preferably 20-80% of the size of the first amount of particulate.

In certain embodiments, the selection of the size of the second amount of flakes is dependent upon maximizing or optimizing a packed volume fraction (PVF) of the mixture of the first amount of particulates and the second amount of flakes. The packed volume fraction or packing volume fraction (PVF) is the fraction of solid content volume to the total volume content. In certain embodiments, the selection of the size of the second amount of flakes is dependent upon maximizing or optimizing a packed volume fraction (PVF) of the mixture of the first amount of particulates and the second amount of flakes in narrow voids between 3 mm and 2 cm. In certain embodiments, the selection of the size of the second amount of flakes is dependent upon maximizing or optimizing a packed volume fraction (PVF) of the mixture of the first amount of particulates and the second amount of flakes in a fracture or slot with width of less than 20 mm. In certain embodiments, PVF may not necessarily the criterion for selecting the size of flakes.

In certain further embodiments, the selection of the size for the second amount of particulates/flakes is dependent upon the characteristics of the void behind casing and upon maximizing a packed volume fraction (PVF) of the mixture of the first amount of particulates and the second amount of particulates/flakes as discussed above. Also in some embodiments, the same chemistry can be used for the second average particle/flake size. Also in some embodiments, different chemistry can be used for the same second average particle size: e.g. in the second average particle size, half of the amount is PLA and the other half is PGA.

In certain further embodiments, the composition further includes a third amount of particulates/flakes having a third average particle size that is smaller than the second average particle/flake size. In certain further embodiments, the composition may have a fourth or a fifth amount of particles/flakes. Also in some embodiments, the same chemistry can be used for the third, fourth, or fifth average particle/flake size. Also in some embodiments, different chemistry can be used for the same third average particle size: e.g. in the third average particle size, half of the amount is PLA and the other half is PGA. For the purposes of enhancing the PVF of the composition, more than three or four particles sizes will not typically be required. However, additional particles may be added for other reasons, such as the chemical composition of the additional particles, the ease of manufacturing certain materials into the same particles versus into separate particles, the commercial availability of particles having certain properties, and other reasons understood in the art.

In certain further embodiments, the composition further has a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

In some embodiments, the carrier fluid may optionally further comprise fibers. The fibers may be straight, curved, bent or undulated. Other non-limiting shapes may include hollow, generally spherical, rectangular, polygonal, etc. Fibers or elongated particles may be used in bundles. The fibers may have a length of less than about 1 mm to about 30 mm or more. In certain embodiments the fibers may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The fiber may be formed from a degradable material or a non-degradable material. The fiber may be organic or inorganic. Non-degradable materials are those wherein the fiber remains substantially in its solid form within the well fluids. Examples of such materials include glass, ceramics, basalt, carbon and carbon-based compound, metals and metal alloys, etc. Polymers and plastics that are non-degradable may also be used as non-degradable fibers. These may include high density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable fibers may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Degradable materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment.

Also, fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

In some embodiments, the carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The composition may be used for carrying out a variety of subterranean treatments, including, but not limited to, drilling operations, fracturing treatments, diverting treatments, zonal isolation and completion operations (e.g., gravel packing). In some embodiments, the composition may be used in treating a portion of a subterranean formation. In certain embodiments, the composition may be introduced into a well bore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore.

Figure 7:
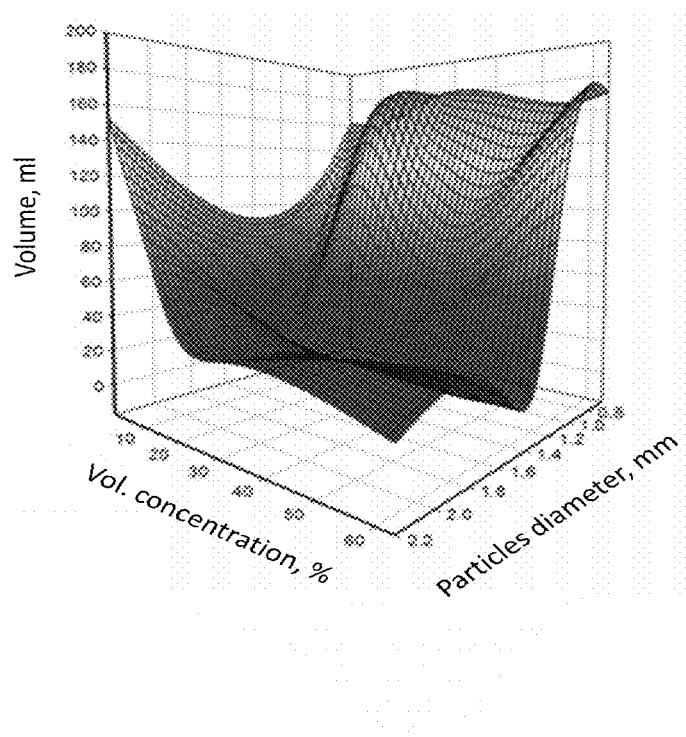
FIG. 7 shows dependence of fluid volume lost during formation of a plug in 16 mm slot on the size and volumetric concentration of the second particles in the blend of particles.

Methods of wellsite and downhole delivery of the composition are the same as for existing particulate diverting materials. Typically such particulate materials are introduced in the pumping fluid and then displaced into the perforations at high pumping rate. The list of injecting equipment may include various dry additive systems, flow-through blenders etc. In one embodiment the blends of particles may be batch missed and then introduced into the treating fluid in slurred form. Simple flow-through injecting apparatuses may also be used as the one which scheme is shown in FIG. 7. In one embodiment the composition may be delivered downhole in a bailer or in a tool comprising bailer and a perforation gun as described in US Patent Application 2008/0196896 incorporated herewith by reference. Other way of delivery of the composition can be envisioned for example with a wireline tool, a drill string, through a slickline, with a coil tubing or microcoil, with a downhole tool or any type of other device introduced downhole and able to deliver the composition at a defined location. A microcoil or Microhole Coiled Tubing Drilling Rig (MCTR) is a tool capable of performing an entire "grass-roots" operation in the 0-5000 ft true vertical depth range including drilling and casing surface, intermediate, and production and liner holes.

As soon as the volume of diverting blend required for treatment diversion is relatively low there is a risk that particles in the blend will be separated during pumping through the well bore. It may result in poorer treatment diversion because of forming plugs of higher permeability than expected. To avoid this situation long slugs with low concentration of diverting blends may be introduced in the treating fluid for minimizing the risk of particles separation in the main amount of the pumped blend. In one other embodiment, to avoid this situation diverting blends may be pumped in long slugs at low concentrations which will make volume of the diverting stage comparable with the volume of the well bore. For example for wells with well bore volume of 200 bbl (32 m$^3$) the volumes of the diverting stage that minimizes the risk of particles separation may be in the range of 20-100 bbl (3.2-16 m$^3$). For 5-25 kg of diverting material it corresponds to the range of concentrations of 0.3-8 kg/m$^3$.

Creating plugs of the proposed diverting blends happens by accumulating particles in the void space behind casing. Examples of such voids may be perforation tunnels, hydraulic fractures or wormholes. Plug creation consists of two steps. In the first step some largest particles in the diverting blend jam in the void creating a bridge. During the next step other particles are being accumulated at the formed bridge resulting in plug formation.

After treatment, the created plugs are removed. There are several methods that may be applied for removal of the created plugs. If the composition comprises degradable materials, self degradation will occur. If the composition comprises material reacting with chemical agents, those are removed by reacting with other agents. If the composition comprises melting material, melting may result in reduction in mechanical stability of the plug. If the composition comprises water soluble or hydrocarbon soluble materials. Plug removal may be achieved through physical dissolution of at least one of the components of the diverting blend in the surrounding fluid. Solubility of the mentioned components may be in significant dependence on temperature. In this situation post-treatment temperature recovery in the sealed zone may trigger the removal of the sealer. Disintegration of at least one component of the composition may occur. Plug removal may be also achieved through disintegration of the sealer into smaller pieces that will be flushed away. List of possible materials that may possess disintegration include plastics such as PLA, polyamides and composite materials comprising degradable plastics and non-degradable fine solids. It worth to mention that some of degradable material pass disintegration stage during degradation process. Example of it is PLA which turns into fragile materials before complete degradation.

To facilitate a better understanding, the following examples of embodiments are given. In no way should the following examples be read to limit, or define, the scope of the overall invention.

EXAMPLES

A series of experiments were conducted to demonstrate the methods of treatment.

Example 1

This example demonstrates that the amount of diverting blends required for treatment diversion between several perforation clusters in slick water treatment may be as low as several kilograms when such diverting blends are designed for sealing seals in perforations or in near-well bore zone in the close proximity to such perforations.

For a fracturing stage comprising simultaneous slick-water fracture treatment of several clusters the following parameters are taken Number of perforation clusters: 6

Diameter of perforation holes: 0.33 in (8.4 mm)

Length of a perforation tunnel: ⅓ ft (10 cm)

Length of a perforation cluster: 1 ft (0.34 m)

Perforation density: 6 shots/ft (18 shots/m)

For the diversion between perforation clusters we assumed that isolation of ⅓ of all perforation tunnels is required (6×6/3=12 perforations). Volume of each perforation is estimated as a volume of a cone having diameter of a perforation hole and height equal to the length of the perforation tunnel (see FIG. 2A). For given numbers the volume of each perforation is:

$$V = \tfrac{1}{3}\pi R^2 h \sim \tfrac{1}{3} \times 3.14 \times (0.42)^2 \times 10 \sim 2 \text{ cm}^3$$

Assuming that actual volume of perforation tunnels during fracturing treatment may be higher by a factor of 100 (e.g. because of surface erosion as in FIG. 2B), the total volume of diverting material required for isolation of 12 perforations is:

$$12 \times 2 \times 100 \sim 2000 \text{ cm}^3 = 2 \text{ L}$$

which for a typical range of densities (1-3 kg/L) corresponds to 1-6 kilograms of a diverting material.

Example 2

In this example we illustrate how to design the composition of the particle blend for providing slick water treatment diversion by sealing perforation tunnels.

For slick-water treatments in shale reservoirs, the typical diameter of perforations is 0.33 in (8.4 mm) and the expected fracture width is in the range of 2-6 mm. That gives that the size of the largest particles in diverting blend should be in the range ~6-8 mm for jamming at the fracture entrance.

Figure 3:
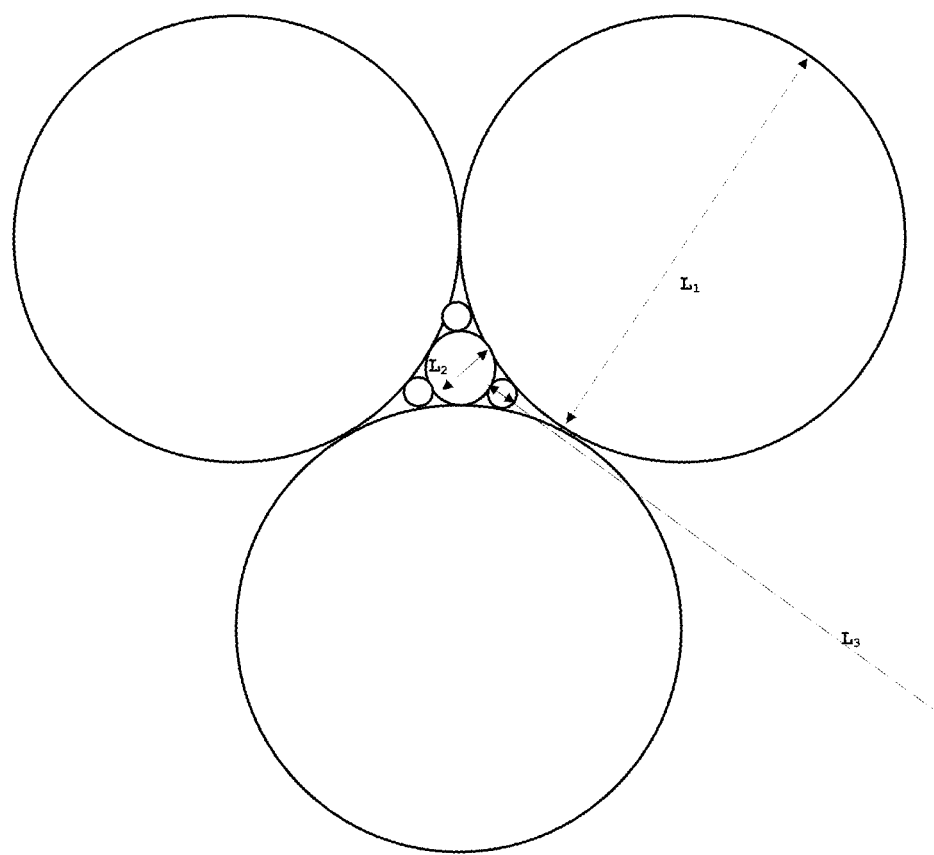
FIG. 3 shows an illustration of particles size distribution required for reducing plug permeability when the size of the largest particles in the blend is significantly smaller than the size of the void to plug.
Figure 4:
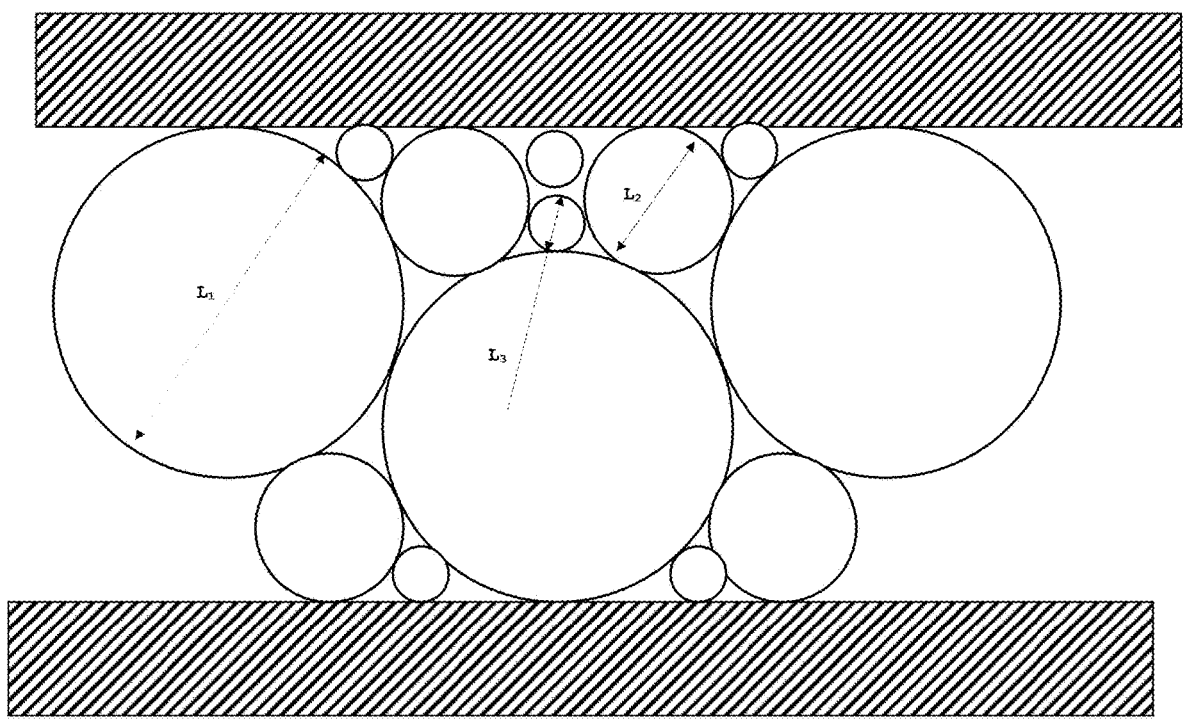
FIG. 4 shows an illustration of particles size distribution required for reducing plug permeability when the size of the largest particles in the blend is comparable with the size of the void to plug.

It is important to note that recommendations for the particles size distribution in the blend of particles for creating plugs of low permeability are significantly different when large or narrow voids must be plugged. That situation is illustrated by FIG. 3 and FIG. 4. Moreover, using recommendations for particle size distribution as in FIG. 3 for sealing narrow slots results in squeezing all particles through the channels between largest particles in the blend (see FIG. 4).

Figure 2:
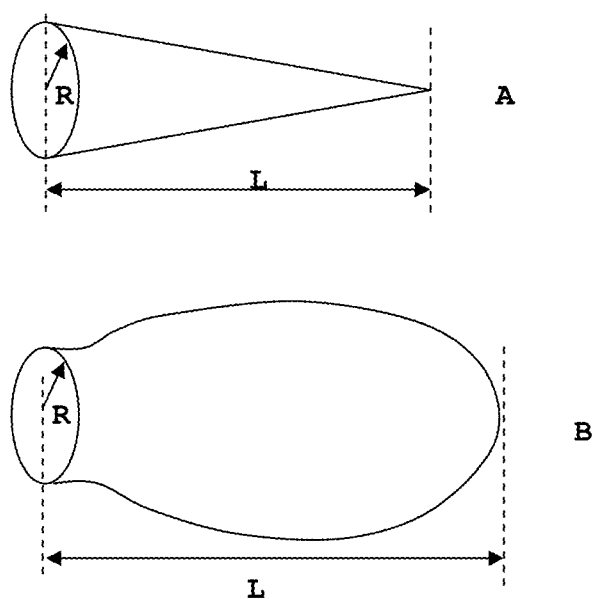
FIG. 2 shows an illustration of shapes of perforation tunnels: A shows the ideal shape, B shows the shape after erosion.
Figure 5:
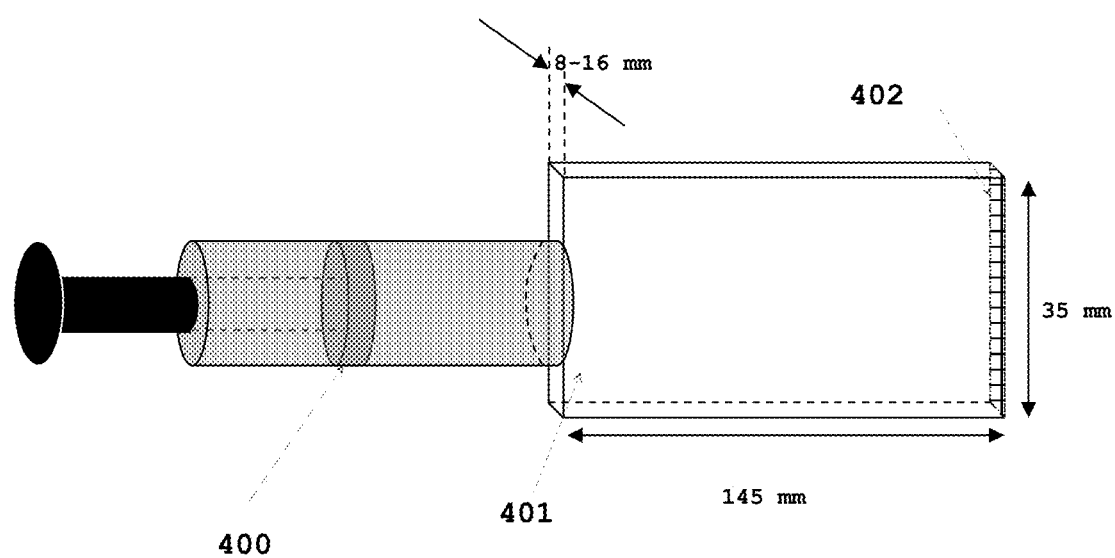
FIG. 5 shows scheme of the apparatus used for optimizing particles size distribution for sealing voids with width of 16 mm.

For defining particle size distribution required for creating plug of low permeability in a perforation tunnel we assumed that the actual width of the perforation tunnel is higher than the diameter of the perforation hole (e.g. because of erosion as shown in FIG. 2B). Used laboratory setup comprised a syringe 400 connected to a slot 401 with the width in the range of 8-16 mm (see FIG. 5). The slot was equipped with a sieve 402 with the size of the openings smaller than the diameter of the largest particles but bigger than the diameter of any other particles in the tested blends. Used blends had the composition shown in Table 1.

TABLE 1

| N | Particle size | Volume (68.8% total) | Optimal particle size for enabling low plug permeability (16 mm slot) | Optimal particle size ratio (16 mm slot) | | | |
|---|---|---|---|---|---|---|---|
| 1 | 6.5 mm | 25.0 | 6.5 | 4.2 | | | |
| 2 | 0.64-4.5 mm | 12.5 | 1.55 | 1 | 2.4 | | |
| 3 | 0.25-1.3 mm | 6.3 | 0.66 | | 1 | 2.7 | |
| 4 | 0.45-0.042 mm | 6.3 | 0.2475 | | | 1 | 5.9 |
| 5 | 0.01-0.115 mm | 12.5 | 0.042 | | | | 1 |
| 6 | 6-14 microns | 6.3 | ~10 microns* | | | | |

*The size was not optimized

Figure 6:
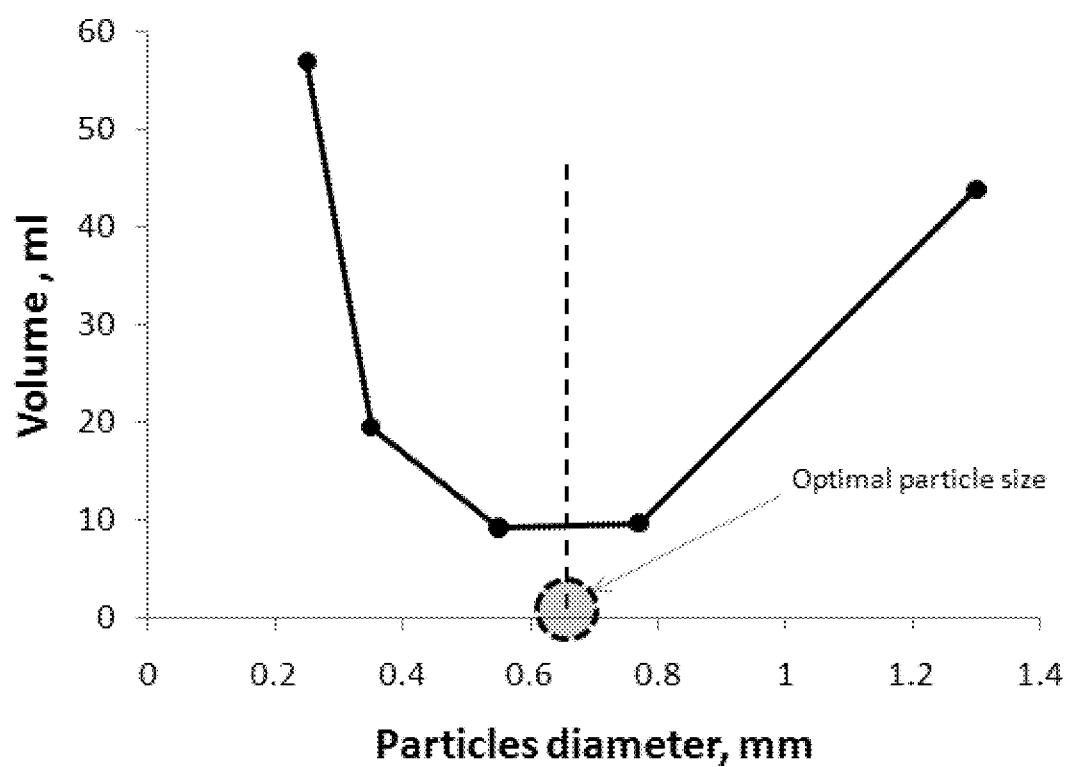
FIG. 6 shows dependence of fluid volume lost during formation of a plug in 16 mm slot on the size of the third particles in the blend of particles.

During performed experiments the slurry comprising 0.5% solution of guar gum and the blend of particles was displaced from the syringe into the slot where the plug was formed. The volume of slurry that came from the slot during plug formation was measured and plotted versus particle size for each type of particles (see example data on FIG. 6). In those experiments volumetric concentrations were constants and particles size varied. Optimal particle size was defined as the particles diameter that corresponded to minimal fluid loss during plug formation (see example data in FIG. 6). Obtained values for optimal particle sizes in the blend as well as optimal particle size ratios are provided in Table 1.

In other similar experiments concentrations and sizes of the particles were varied in order to find optimal volumetric concentrations using the described procedure. It was found that the optimal particle size down not depend on the concentration of such particles in the blend (see FIG. 7). It was also found that the optimal particle sizes and concentrations are not impacted by the changing concentrations and sized of other particulate components in the taken blend.

Example 3

In this example we illustrate how to design the composition of the blend comprising particles and flakes for providing slick water treatment diversion by sealing perforation tunnels. In this example the blend consists of one large particulate component and several flake components of smaller sizes. The described procedure is similar to the procedure described in the Example 2.

For slick-water treatments in shale reservoirs, the typical diameter of perforations is 0.33 in (8.4 mm) and the expected fracture width is in the range of 2-6 mm. That gives that the size of the particles of the particulate component in diverting blend should be in the range ~6-8 mm for jamming at the fracture entrance.

For defining flake size distribution required for creating plug of low permeability in a perforation tunnel we assumed that the actual width of the perforation tunnel is higher than the diameter of the perforation hole (e.g. because of erosion as shown in FIG. 2B). Used laboratory setup was the same as in Example 2 and comprised the syringe 400 connected to the slot 401 with the width in the range of 8-16 mm (see FIG. 5). The slot was equipped with the sieve 402 with the size of the openings smaller than the diameter of the largest particles in the tested blends. Used blends had the composition shown in Table 2.

For flake components we used mica flakes with the thickness of ~20 microns. The size of the flakes was defined using sieve analysis. During performed experiments the slurry comprising 0.5% solution of guar gum and the blend of particles and flake components was displaced from the syringe into the slot where the plug was formed. Sizes of the particles and flakes and composition of the blend used in the experiment are shown in Table 2 below.

TABLE 2

| N | Type | Volume (40% total) | Size | Optimal particle size ratio (16 mm slot) |
|---|---|---|---|---|
| 1 | Spherical particles | 28 | 6.5 mm | 2.4 |
| 2 | Flakes | 4 | Varied from 12/14mesh to 4/6 mesh (from 1.54 mm to 4.06 mm) | 1 |
| 3 | Flakes | 4 | 20/40 mesh (0.6 mm)* | |
| 4 | Flakes | 4 | 70/140 mesh (0.15 mm)* | |

*The size was not optimized

Figure 8:
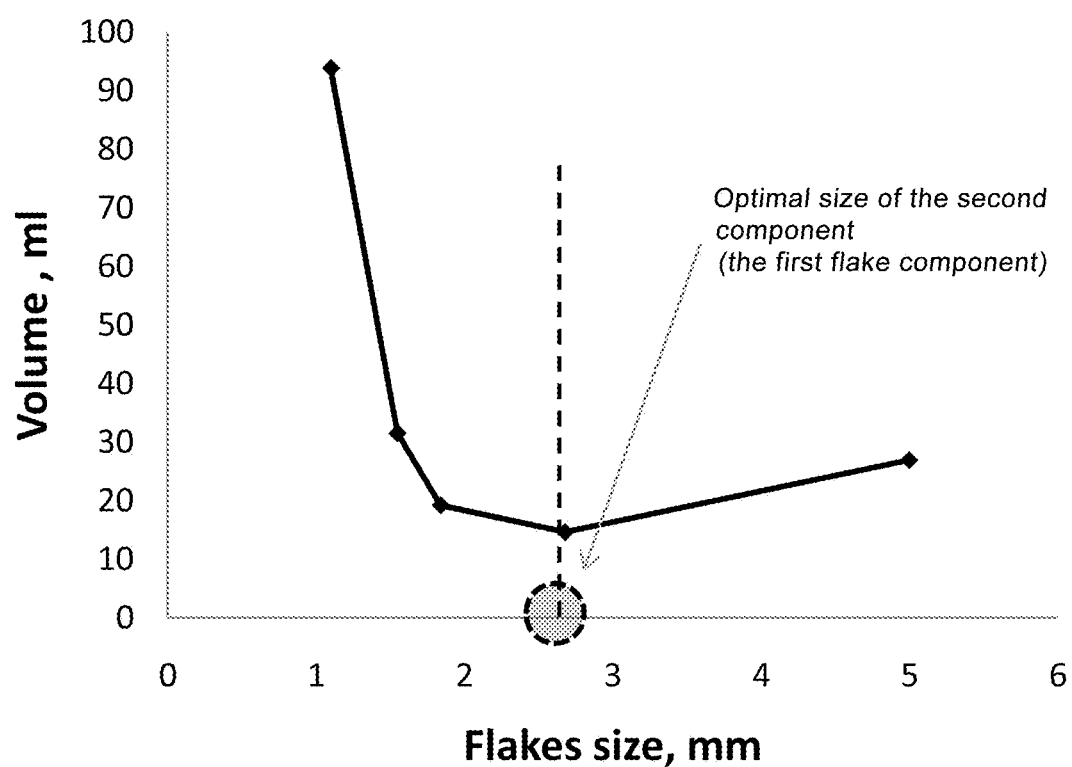
FIG. 8 shows dependence of fluid volume lost during formation of a plug in 16 mm slot on the size of the second component (the first flake component) in the blend of particles and flakes.
Figure 9:
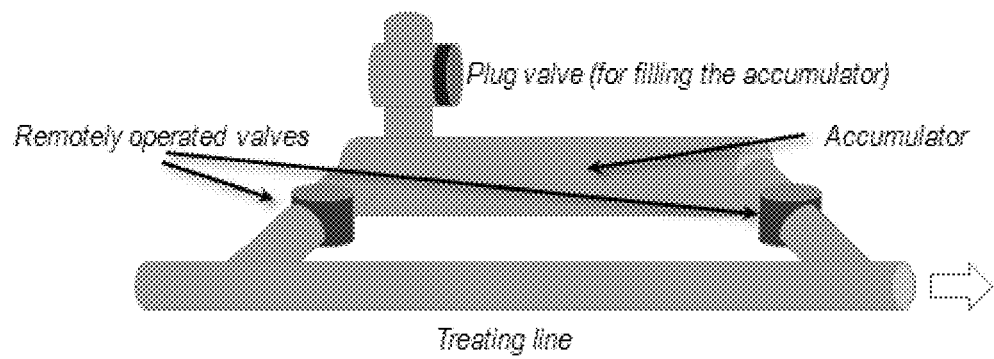
FIG. 9 shows a simplified scheme of the injection setup for the proposed diverting blends.

During performed experiments the volume of slurry that came from the slot during plug formation was measured and plotted versus flakes size. In those experiments volumetric concentrations were constants and the size of the second component (the first flake component) varied. Optimal flake size was defined as the size of that corresponded to minimal fluid loss during plug formation (see example data in FIG. 8). The obtained data show, that the leak-off during plug formation is minimal when the size of the second component (the first flake component) in the using diverting blend is >10% of the diameter of the first particulate component.

Example 4

In this example we provide description of the experiment on creating a plug of a blend of particles and flakes. Formed plug has permeability of 0.6-0.8 Darcy which is enough for providing treatment diversion effect during high-rate slick-water treatments.

Figure 10:
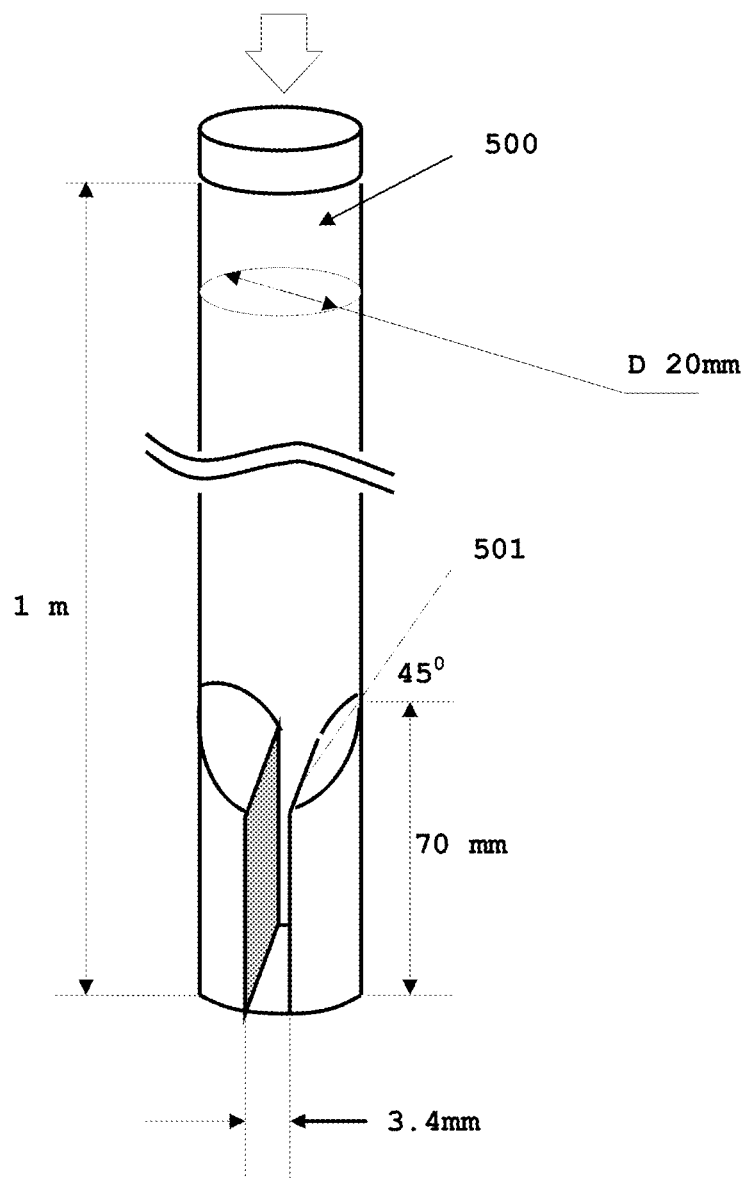
FIG. 10 shows scheme of the laboratory setup used for creating a plug of a blend of particles and flakes.

For plug creation, we used laboratory which scheme is shown in FIG. 10.

The setup consists of an accumulator 500, 3.4 mm slot 501 and a pump (not shown) connected to the accumulator. Before the experiment the accumulator was filled with the slurry which comprised the following components:
Fluid: 0.5% guar gum solution
Particles (PLA, 4 mm in diameter): 80 g/L (0.7 ppa)
Flakes (mica 0.5-1.5 mm): 100 g/L (0.9 ppa)

Figure 11:
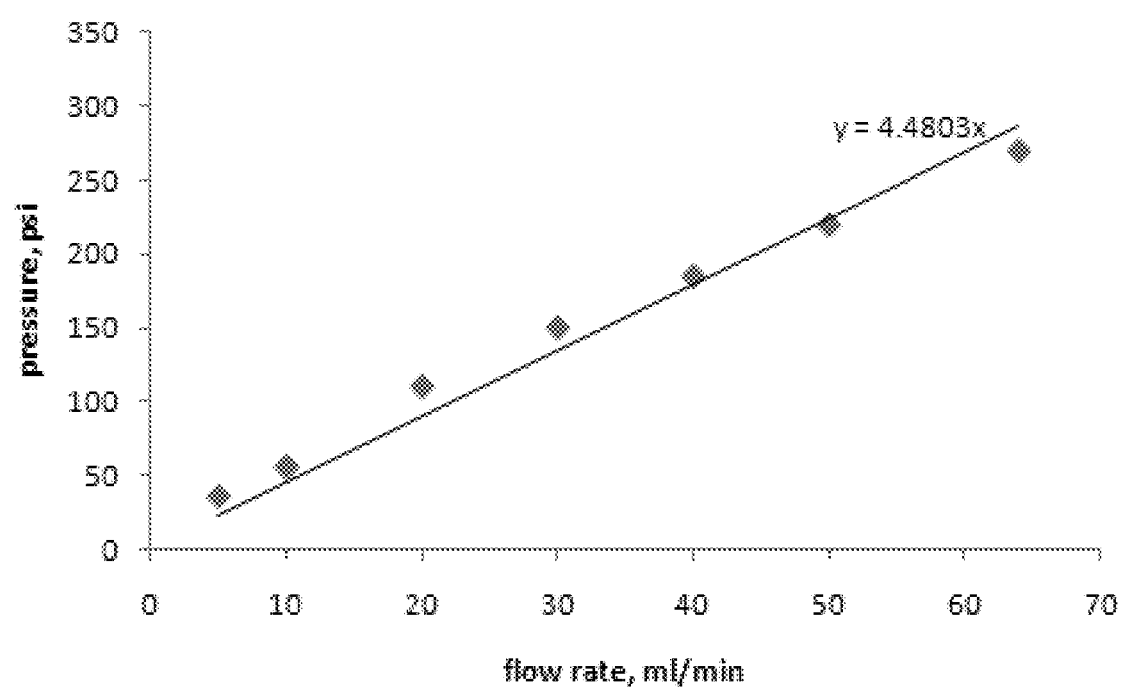
FIG. 11 shows dependence of differential pressure across the plug on pumping rate.

Then the composition was displaced into the slot with water at initial pumping rate of 100 mL/min. Permeability of the formed plug was calculated from the pressure drop across the plug at various pumping rates (see FIG. 11). Obtained value was in the range of 0.6-0.8 Darcy.

Example 5

The friction force between trefoil particulates and a surface was measured by pushing the particulates inside a pipe. The inside diameter of the pipe is 20.5 mm, and the height is 30 cm. After a piston was placed at the bottom end of the pipe, the particulates for test were poured into the pipe. A metal rod of 700 g was released from the top end of the pipe to compress the pack of particulates for six times. Then, the pipe was mounted onto a loading frame (Texture Analyzer HD, Stable Micro Systems, Ltd). The piston pushed the pack of particulates, during which both the displacement and the force, F, are measured under displacement control mode with a rate of 0.1 mm/sec. The friction force, f, was obtained through subtracting the measured force F by the weight of the particulate pack and the friction force between the piston and the empty pipe.

Figure 13A:
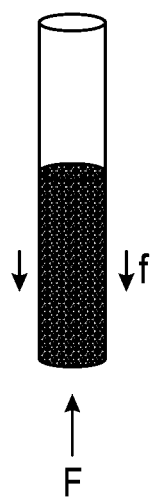
FIG. 13a shows a schematic of measuring the friction force, f, between particles and the wall of a pipe.
Figure 13B:
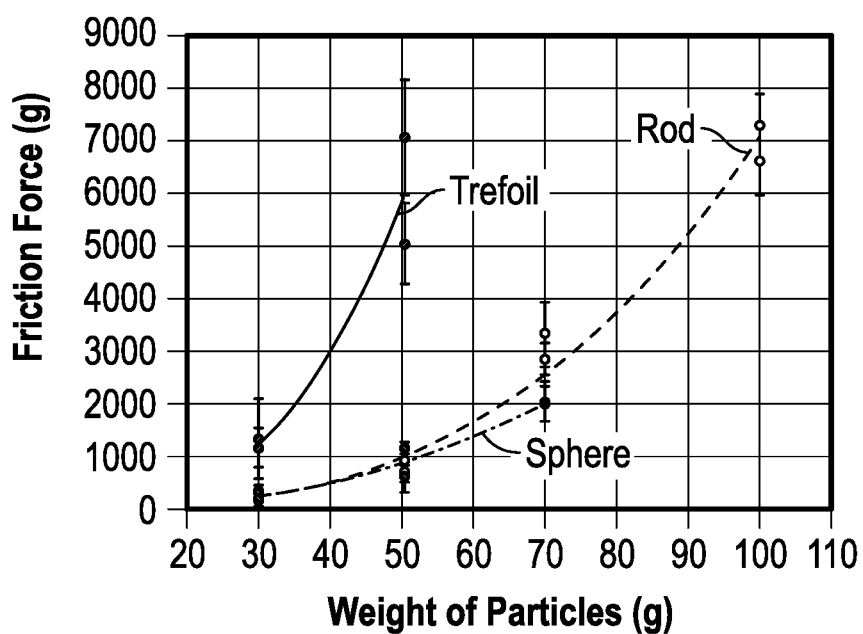
FIG. 13b shows the friction force as a function of the weight of the particles including trefoil, rod, and sphere.

Besides the trefoil particulate, friction forces were also measured for rod-shaped particulates with circular cross-sections and spherical particulates. These three particulates are made of same ceramic material with comparable sizes. The friction force as a function of the weight of the packs of particulates tested are shown in FIG. 13b, indicating the friction force for the trefoil particulates is far larger than for rods with circular cross-section and spheres. Thus, the trefoil particulates may be used to enhance the bridging capability and the stability of the plug.

Example 6

Example on Permeability Performance:

In this example, described is the assessment of permeability of a plug of a blend of degradable particles and the trefoil particulate. For plug creation, we used a laboratory setup consisting of an accumulator, a set of screens located at one end of the accumulator to support the particulates during flow, and a pump connected to the accumulator. Before the experiment the accumulator was filled with the water-based slurry which comprised the following components:

Degradable multi-modal particles, size range 0.1-6.5 mm: 340 g/L,
Trefoil-shaped particles, average characteristics size 3 mm: 280 g/L Then, the composition was displaced into the screens with water at pumping rates ranging between 300-700 mL/min. Permeability of the formed plug was calculated from the pressure drop across the plug at various pumping rates (similar procedure as for FIG. 11). The estimated value of permeability was approximately 8 Darcy.

The foregoing disclosure and description is illustrative and explanatory, and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a subterranean formation penetrated by a well bore having a well bore volume, comprising:
providing a treatment fluid comprising a blend including a first amount of particulates having a first average particle size between about 3 mm and 2 cm and a second amount of particulates having a second average size between about 1.6 and 20 times smaller than the first average particle size, wherein the second amount of particulates has a trefoil cross sectional shape having enhanced friction force from about 1000 g to 6000 g per about 30 g to about 50 g of the second amount of particulates;
introducing the treatment fluid into the well bore;
creating a plug with said treatment fluid; and
increasing stability of the created plug with the enhanced friction force of the second amount of particulates.

2. The method of claim 1, wherein the treatment fluid comprises a carrier fluid, and a viscosifying agent or friction reducer.

3. The method of claim 2, wherein the carrier fluid is a treatment fluid selected from the group consisting of slickwater, spacer, mutual solvent, flush, formation dissolving fluid, fracturing fluid, scale dissolution fluid, paraffin dissolution fluid, asphaltene dissolution fluid, diverter fluid, water control agent, chelating agent, viscoelastic diverting acid, self-diverting acid, acid, and mixtures thereof.

4. The method according to claim 1, further comprising removing the plug.

5. The method according to claim 1, wherein the blend comprises a degradable material, a soluble material, or a meltable material at downhole conditions.

6. The method of claim 5, wherein the blend comprises the degradable material, and the degradable material is a polylactic acid material.

7. The method according to claim 1, wherein the treatment fluid further comprises fibers.

8. The method of claim 1, wherein the introducing of the treatment fluid takes place during a single- or multi-stage fracturing treatment.

9. The method according to claim 1, wherein the first amount of particulates has an aspect ratio smaller than 5.

10. The method according to claim 1, wherein the first average particle size is between about 3 mm and 20 mm.

11. The method according to claim 1, wherein the treatment fluid further comprises a third amount of particulates or flakes having a third average size smaller than the second average size.

12. The method of claim 11, wherein the treatment fluid further comprises a fourth and a fifth amount of particulates or flakes having a fourth average size smaller than the third average size, and a fifth average size smaller than the fourth average size, respectively.

13. The method according to claim 1, wherein the treatment fluid is such that a packed volume fraction of the blend exceeds 0.7.

14. A method of treating a subterranean formation of a well bore having a volume, wherein the well bore comprises a casing and at least one hole on said casing, said hole having a diameter, the method comprising:
 a. providing a treatment fluid comprising a blend including a first amount of particulates having a first average particle size between about 50 to 100% of said diameter and a second amount of particulates having a second average size between about 1.6 and 20 times smaller than the first average particle size, wherein the second amount of particulates comprises a rod-shaped proppant that has a cross sectional trefoil shape having enhanced friction force from about 1000 g to 6000 g per about 30 g to about 50 g of the second amount of particulates;
 b. introducing the treatment fluid into the hole;
 c. creating a plug with said treatment fluid in the hole;
 d. increasing stability of the created plug with the enhanced friction force of the second amount of particulates; and
 e. removing the plug.

15. The method of claim 14, wherein the first average particle size is between about 3 mm and 2 cm.

16. The method according to claim 14, wherein the first amount of particulates has an aspect ratio smaller than 5.

17. The method according to claim 14, wherein the treatment fluid is such that a packed volume fraction of the blend exceeds 0.7.

18. The method according to claim 14, wherein the blend comprises a degradable material, a soluble material, or a meltable material at downhole conditions.

19. The method of claim 18, wherein the blend comprises the degradable material, and the degradable material is a polylactic acid material.

20. The method according to claim 14, wherein the treatment fluid further comprises fibers.

21. The method according to claim 14, wherein the treatment fluid further comprises a third amount of particulates or flakes having a third average size smaller than the second average size.

22. The method of claim 21, wherein the treatment fluid further comprises a fourth and a fifth amount of particulates or flakes having a fourth average size smaller than the third average size, and a fifth average size smaller than the fourth average size, respectively.

23. A method of fracturing a subterranean formation of a well bore having a volume, wherein the well bore comprises a casing and at least one hole on said casing, said hole having a diameter, the method comprising:
 a. providing a diverting fluid comprising a blend including a first amount of particulates having a first average particle size between about 50 to 100% of said diameter and a second amount of particulates having a second average size between about 1.6 and 20 times smaller than the first average particle size, wherein the second amount of particulates comprises a rod-shaped proppant that has a cross sectional trefoil shape having enhanced friction force from about 1000 g to 6000 g per about 30 g to about 50 g of the second amount of particulates;
 b. introducing the diverting fluid into the hole;
 c. creating a diverting plug with said diverting fluid in the hole;
 d. increasing stability of the created diverting plug with the enhanced friction force of the second amount of particulates;
 e. fracturing the subterranean formation by using said diverting plug; and
 f. removing the diverting plug.

* * * * *